Oct. 31, 1950     H. F. FOLEY ET AL     2,527,805
CLUTCH CONTROL MECHANISM
Filed April 12, 1946     2 Sheets-Sheet 2
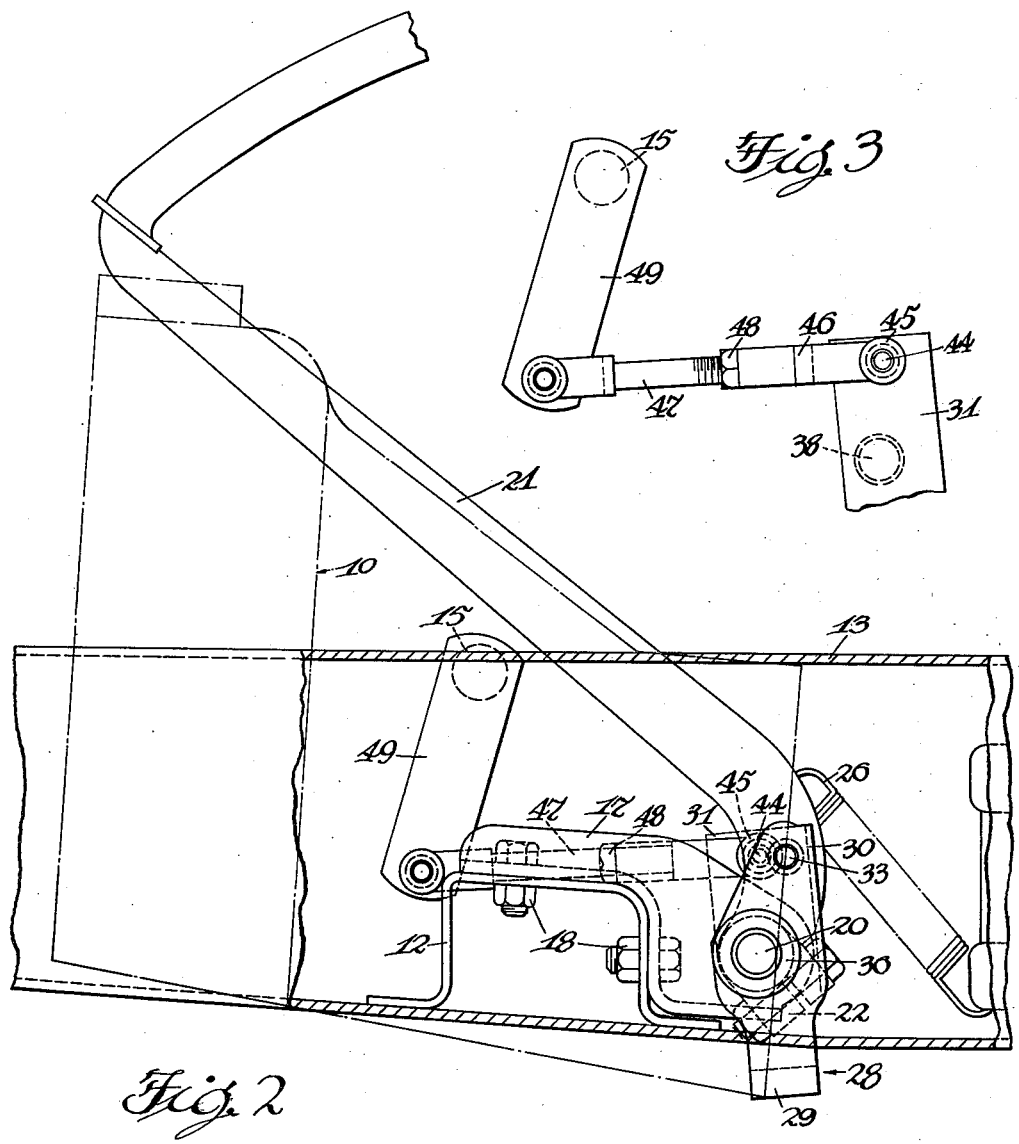
Inventors
Harold F. Foley
Samuel G. Johnson
By Paul O. Pippel
Atty.

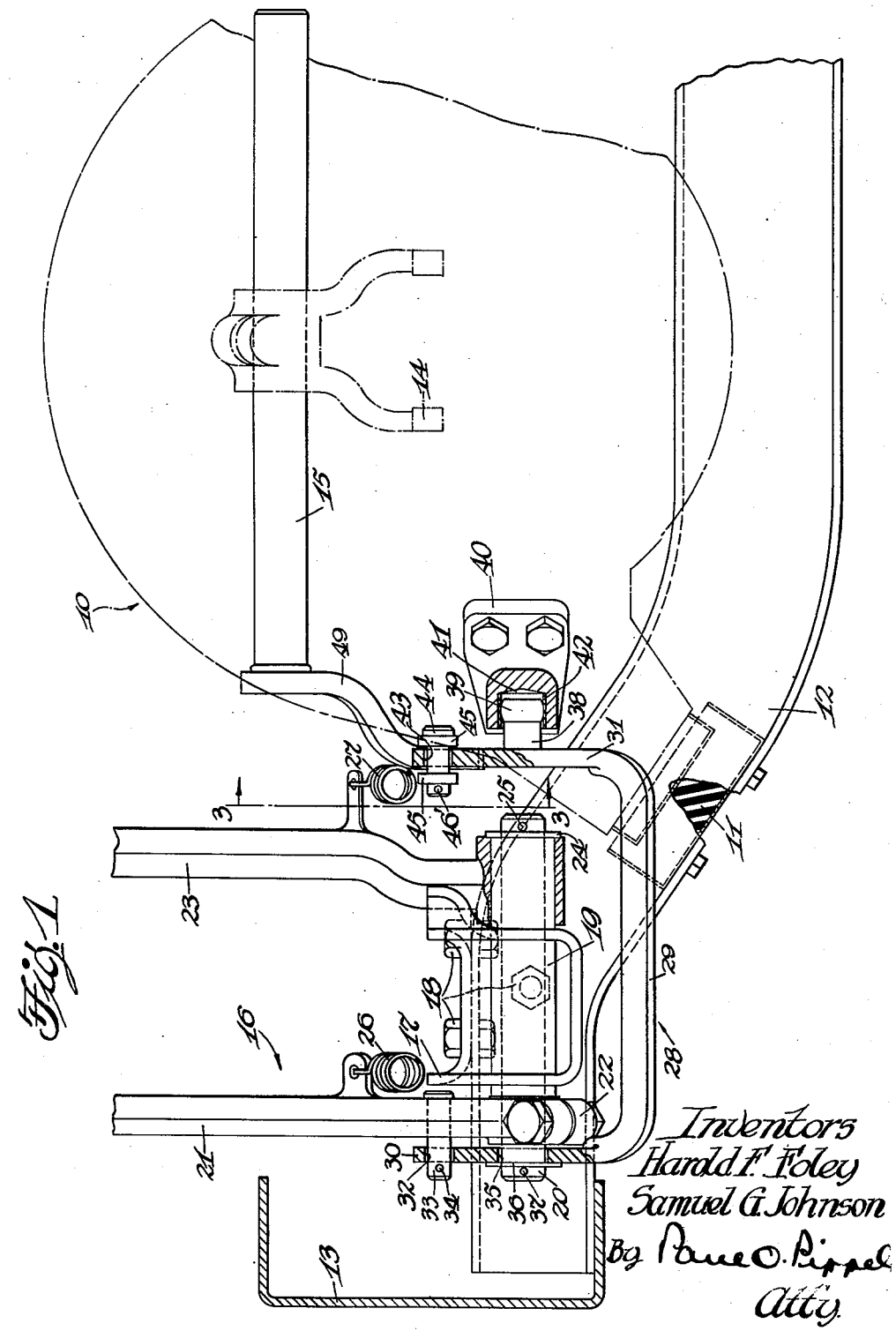

Patented Oct. 31, 1950

2,527,805

UNITED STATES PATENT OFFICE 2,527,805

CLUTCH CONTROL MECHANISM

Harold F. Foley and Samuel G. Johnson, Fort Wayne, Ind., assignors to International Harvester Company, a corporation of New Jersey Application April 12, 1946, Serial No. 661,770

4 Claims. (Cl. 192—99)

This invention relates to a clutch actuating mechanism and more particularly to a clutch control means for a resiliently mounted power plant such as used in motor vehicles.

More specifically, this invention relates to a clutch control mechanism of the type wherein the power plant is resiliently mounted with respect to a truck or auto supporting frame, resilient mounting pads accommodating longitudinal oscillation of the power plant during the operation of the same. A clutch disengaging member is usually rigidly connected to the clutch of the engine and oscillates freely therewith. A clutch pedal is stationarily and rotatably mounted on a portion of the frame and is adapted to actuate the clutch disengaging member. In view of the oscillation of the engine with respect to the clutch pedal, the connection between said clutch pedal and the clutch disengaging member must be such as to permit a certain amount of lost-motion movement for preventing undue vibration of the clutch or of the associated parts during the operation and oscillation of the engine. This invention specifically concerns a novel, simple, and inexpensive construction whereby a resilient, though yet positive, connection is accomplished between the clutch pedal and the clutch disengaging member.

It is therefore an object of this invention to provide an improved clutch control mechanism which will accommodate oscillation of a resiliently mounted engine or power plant.

Another object of this invention is to provide a clutch disengaging mechanism for a resiliently mounted power plant, said clutch disengaging mechanism being remotely connected to a frame member and having provisions to accommodate the oscillation of said engine while in operation.

Another object of this invention is to provide a clutch disengaging mechanism for a resiliently mounted power plant, the clutch pedal being stationarily mounted on a frame but having linkage means positively connected to said clutch, the linkage means having a sufficient lost-motion movement with respect to the clutch pedal and to the clutch disengaging member to accommodate oscillation of the engine about its longitudinal axis.

A still further object of this invention is to provide a clutch disengaging mechanism for a resiliently mounted engine, wherein the clutch pedal is rigidly connected to the supporting frame, said clutch pedal being connected to a bail member which in turn is connected to a clutch disengaging member, said connections being sufficiently flexible to accommodate the oscillation of said engine.

Other objects and advantages will be understood and will become more apparent from the following description when read in conjunction with the drawings in which:

Figure 1 is a rear elevational view of a resiliently mounted power plant showing a clutch control mechanism therefor, the clutch control mechanism having portions broken away to better illustrate its construction.

Figure 2 is a side elevational view of the clutch control mechanism.

Figure 3 is a sectional view taken along the line 3—3 of Figure 1.

As best shown in Figure 1, an internal combustion engine or power plant is generally designated by the numeral 10. This power plant 10 is resiliently mounted on mounting pads 11, only one of which is shown, said mounting pads being rigidly connected to a transverse frame member 12. The transverse frame member 12 is carried on longitudinal channel portions 13, only one of which is shown, said portions generally constituting the frame or chassis of an auto or truck body. A clutch actuating member generally in the shape of a yoke 14, as indicated in phantom lines in Figure 1, is suitably connected to a clutch (not shown) for disengaging the same. This clutch disengaging member 14 is rigidly keyed to a transverse shaft 15, said shaft being free to oscillate with the power plant 10.

A clutch control mechanism is generally indicated by the reference character 16 and includes a transverse bracket 17 which is connected to a portion of the frame member 12 by means of bolts 18. The transverse bracket 17 rigidly supports a bearing member 19 in which is journaled a transverse clutch pedal shaft 20. A clutch pedal 21 is securely keyed to the shaft 20 at its outermost portion by clamping means 22. A brake pedal 23 is freely journaled on the innermost portion of the bearing member 19. The brake pedal 23 is held on the bearing member 19 against endwise movement by means of a washer 24 and a pin 25 extending through the shaft 20. Springs 26 and 27 are respectively connected to the clutch and brake pedals to normally keep said pedals in a non-actuating position.

In order to transmit movement from the clutch pedal to the clutch disengaging member 14, a bail member 28 is provided. The bail member 28 consists of a horizontally extending portion 29 connected to upwardly extending leg portions 30 and 31. The outermost leg portion 30 is provided with a bore or opening 32 on its top end, this bore fitting over a dowel pin 33 which is rigidly secured to and projects from the clutch pedal 21. The dowel pin 33 is connected to the leg 30 by means of a lock wire 34. A bore or opening 35 is provided in the leg portion 30 intermediate its ends and rotatably fits said leg over one end of the shaft 20. A washer 36 and lock wire 37 hold the leg portion 30 over the end portion of the shaft 20 and provide for limited endwise movement of said leg portion.

A stub shaft 38 is connected to the leg portion 31, said stub shaft being substantially in transverse alinement with the clutch pedal shaft 20. The stub shaft 38 is provided at its end with a semicircular shoulder portion 39. A bracket 40 is rigidly connected to the power plant 10 and is formed with a socket portion 41 containing a bearing sleeve 42. The shoulder portion 39 is journaled on the sleeve 42 of the socket 41 and provides a ball and socket connection having a limited amount of universal movement.

The uppermost portion of the leg 31 is provided with a bore or opening 43 through which extends a dowel pin 44, said dowel pin 44 being suitably connected to the leg portions 45 of a link 46 and held for limited endwise movement by means of a lock wire 46' transversely connected through the dowel pin. A connecting member 47 is adjustably connected to the link 46 by means of a lock nut 48. The connecting link 47 is rotatably connected at its free end to a depending arm 49 rigidly secured to the transverse shaft 15.

The bores 32, 35, and 43 of the bail member 28 have a sufficient amount of clearance, with respect to their connecting dowel pins 33 and 34 and the clutch shaft 20, to provide a sufficient amount of lost-motion movement which will accommodate oscillation of the engine about its axis during actuation of the clutch pedal. The bail member 28 is thus permitted to have a limited amount of angular movement by virtue of its lost-motion connection to the clutch pedal 20 and the depending arm 49 of the clutch disengaging shaft 15. The stub shaft 38 and the shoulder portion 39 mate with the socket 41, anchoring the leg portion 31 sufficiently against fore and aft thrust so that actuating movement of the clutch pedal 20 is immediately imparted to the clutch actuating member 14. The lost-motion connections are insufficient to prevent prompt and efficient actuating movement of the clutch disengaging member 14, though they are effective to permit the required angular movement of the bail member 28 thereby preventing clutch chattering caused by the oscillation of the power plant 10.

It should now be apparent that a novel clutch actuating mechanism has been shown and described, and it is to be understood that changes may be made in the construction without departing from the spirit of the invention nor the scope thereof as defined in the appended claims.

What is claimed is:

1. For a power unit including a rigid frame structure, an internal combustion engine yieldably mounted thereon and having a clutch, a clutch operating member carried by the engine, and a clutch control member movable on the frame: means connecting the clutch operating member and clutch control member comprising a transverse shaft carried by the frame and providing a fulcrum about which the clutch control member may be rotated; a bail, having a transverse portion and a pair of legs, positioned between the frame and the engine; means pivotally mounting one leg of the bail around said shaft; means connecting the other leg of the bail to the engine including a ball and recess mounting arranged generally in axial alignment with the shaft; means connecting one leg of the bail to the clutch control member for movement therewith; and means connecting the other leg of the bail to the clutch operating member for transmitting movement of the clutch control member through the bail to the clutch operating member.

2. The invention defined in claim 1, further characterized in that: the means for pivoting the said one leg of the bail to the shaft includes an opening in said leg through which the shaft passes, said opening being slightly larger in diameter than the shaft to provide a lost-motion connection between the shaft and bail.

3. The invention defined in claim 1, in which: the ball and recess mounting and the connections between the bail and shaft and between the bail and clutch control member include structure providing for lost motion generally axially of the shaft.

4. The invention defined in claim 1, in which: the means connecting the clutch control member and the one leg of the bail is characterized by a pin affixed to the clutch control member that cooperates with a recess provided in the bail, the pin being relatively smaller than the recess to provide limited lost motion between the clutch control member and the bail.

HAROLD F. FOLEY.
SAMUEL G. JOHNSON.

REFERENCES CITED

The following references are of record in the file of this patent:

UNITED STATES PATENTS

| Number | Name | Date |
|---|---|---|
| 1,909,423 | Pfeiffer et al. | May 16, 1933 |
| 1,954,234 | Zimmerman | Apr. 10, 1934 |
| 1,999,262 | Tenney | Apr. 30, 1935 |
| 2,097,203 | Wemp | Oct. 26, 1937 |
| 2,275,158 | Nutt | Mar. 3, 1942 |
| 2,321,513 | Reed | June 8, 1943 |